3,033,895
PROCESS FOR THE PRODUCTION OF ESTERS

Caleb Rehfuss, North Wales, Pa., and Francis C. Huber, Moorestown, N.J., assignors to Allied Chemical Corporation, New York, N.Y., a corporation of New York
No Drawing. Filed Apr. 27, 1959, Ser. No. 808,934
7 Claims. (Cl. 260—475)

This invention relates to a process for the esterification of dicarboxylic acids with higher aliphatic alcohols contaminated with aliphatic esters of higher aliphatic acids, and more particularly to such a process in which the formation of troublesome emulsions is minimized or avoided.

It is well known to prepare esters suitable for use as plasticizers by the interaction of dicarboxylic acids with monohydric aliphatic alcohols, with the aid of acid catalysts.

In recent years, dicarboxylic acid esters of $C_6$ to $C_{12}$ aliphatic alcohols, and more particularly the $C_8$ to $C_{10}$ alcohols, have come into wide use as plasticizers for synthetic resinous materials such as polyvinyl chloride, and for other plasticizer uses.

Alcohols of this character may be derived from a number of sources, for example, they may be prepared by the hydrogenation of naturally occurring oils such as coconut oil, palm kernel oil, etc. Such alcohols are also prepared synthetically, for example, by the "Oxo" process in which an olefin is carbonylated and hydrogenated by the addition of carbon monoxide and hydrogen in the presence of a catalyst.

Many of the alcohols thus prepared contain, as impurities, appreciable proportions of aliphatic esters of higher fatty acids formed during their preparation. When such alcohols, containing such residual ester bodies, are esterified in conventional manner, they yield esters which, on neutralization and washing as customarily practiced, form heavy emulsions which are exceedingly difficult to separate, and which on attempted concentration, as by blowing with steam, to remove residual alcohol and entrainer, often foam badly and form solid gels of foam, resulting in complete blockage of the condenser system.

In addition to the creation of operating difficulties in the nature of emulsion and foam formation, such finished esters often are unacceptably dark in color, even after treatment with active carbon, or other decolorizing agents.

As light colored esters are in high demand for use as plasticizers in compositions which are either colorless or which use light colored pigments to produce clear pastel colors or the like, the lighter the color of the ester, the higher the market value of the ester. Dark colored esters may be used for certain applications, but any lightening of the color of such esters improves their value.

Attempts to remove the residual fatty acid ester contaminants from such alcohols by prior saponification, flash distillation, fractionation and the like, have been largely unsatisfactory, either in failing to obviate the difficulties or in being uneconomic.

Thus, saponification of the residual fatty acid esters in the alcohol before esterification, results in an alcohol soluble soap, which cannot readily be removed from the alcohol. Flash distillation of the saponified alcohol, not only leaves a troublesome, large, semi-solid, unburnable residue, but, upon esterification of the alcohol thus produced, troublesome foaming occurs during concentration. Careful fractionation of the alcohol and esterification only of the portion from which front end and undesirable intermediate cuts are removed, gives satisfactory operation but results in such low yield on the original alcohol as to be uneconomic.

It is an object of the present invention to provide a process for esterifying dicarboxylic acids with $C_6$ to $C_{12}$ aliphatic alcohols contaminated with residual aliphatic esters of corresponding $C_6$ to $C_{12}$ aliphatic acids, in which troublesome emulsification and foaming during the recovery process are minimized or avoided.

It is a further object of the invention to provide a process for recovering $C_6$ to $C_{12}$ aliphatic esters of dicarboxylic acids prepared from $C_6$ to $C_{12}$ alcohols contaminated with residual aliphatic esters of higher aliphatic acids, in which troublesome emulsification and foaming are eliminated.

A still further object of the invention is to provide $C_6$ to $C_{12}$ aliphatic esters of dicarboxylic acids of exceptionally light color.

These and other objects are accomplished according to our invention wherein the esterification reaction between a dicarboxylic acid and a $C_6$ to $C_{12}$ aliphatic alcohol contaminated with residual aliphatic esters of corresponding higher fatty acids, is followed by neutralization of the esterification mixture with an unusually large volume, equal to at least about 15% of the volume of the esterification mixture, of an aqueous alkali metal hydroxide solution containing between about 2% and about 3% by weight of alkali metal hydroxide, at critical temperatures of at least about 75° C., and in which the neutralized ester, after separation from the aqueous neutralization medium, is subjected to at least two successive washing steps with similarly large volumes of alkali metal hydroxide solutions in concentrations of between about 0.5% and about 2% at critical temperatures of at least about 75° C. and below the boiling temperature of the resulting mixture.

Alcohols which contain troublesome quantities of residual soapy esters of higher aliphatic acids and which are adapted to be treated according to the process of our invention, are the higher aliphatic alcohols containing from 6 to 12 carbon atoms inclusive. These alcohols include those prepared as by-products of hydrogenation of naturally occurring oils such as coconut oil, palm kernel oil, etc., usually marketed as a blend of $C_6$ to $C_{12}$ alcohols, predominating in alcohols having 8 to 10 carbon atoms, and often referred to as $C_8$–$C_{10}$ alcohol blends. Residual esters present in such alcohols may vary from about 1% to over 5%, the quantity often being in the vicinity of about 3%. The exact nature of these esters is not entirely clear, but it is believed that they are formed from the naturally occurring acids in the oil which become esterified during the hydrogenation. They appear to be predominantly the methyl esters of the aliphatic acids having from 6 to 12 carbon atoms and some glyceryl esters may also be present.

Aliphatic alcohols having from 6 to 12 carbon atoms inclusive, prepared by the "Oxo" process also may contain troublesome residual aliphatic esters, usually containing up to 12 carbon atoms in the alkyl groups, usually from 6 to 12 carbon atoms, which are probably produced from acids formed in the carbonylation and hydrogenation process. Such esters of the higher aliphatic acids may be present in such alcohols in amounts up to about 45%, particularly in residual alcohols remaining after the major portions of the $C_8$ alcohols have been removed.

The esterification mixtures produced when the above alcohols are esterified with any of the common dicarboxylic acids customarily used to produce plasticizer esters, still contain the residual aliphatic esters, and, when neutralized and washed in the usual way, using small volumes (2 to 5% of the charge) of high concentration (about 10%) alkali metal hydroxide solutions, give rise to troublesome emulsification and foaming and form dark colored esters.

According to our invention, such alcohols, when used to esterify any of the dicarboxylic acids of the above type, can be made to yield esterification mixtures free from emulsification and foaming troubles during neutralization and recovery. Such dicarboxylic acid materials include phthalic acid, phthalic anhydride, iso- and terephthalic acids, adipic, azelaic, pimelic, suberic, sebacic, maleic, and fumaric acids and the like.

The success of our process stems, at least in part, from our discovery that the aliphatic esters of the $C_6$—$C_{12}$ aliphatic acids which form the troublesome contaminants in the $C_6$-$C_{12}$ alcohols of the character described, are substantially soluble in, and removable by, dilute alkali metal hydroxide solutions of the particular range of concentrations specified, i.e. of at least about 0.5% and not more than about 3%, when contacted therewith at temperatures above about 75° C. and below the boiling temperature of the resulting mixture, but are virtually insoluble, not only in less concentrated solutions, including water alone, but also in the more concentrated solutions, i.e., above about 5%, thus including the approximately 10% concentrations customarily used in the neutralization of esterification mixtures, and also the lower concentrations of about 5% customarily used in the washing steps.

In carrying out the process according to our invention, conventional esterification procedures and equipment may be employed, preferably carrying out the esterification reaction between the contaminated alcohol and the dicarboxylic acid in the presence of an acid catalyst such as sulfuric acid, an aryl sulfonic acid, alkane sulfonic acids or the like, and in the presence of a water-entraining agent such as benzene, toluene, xylene, etc.; or excess alcohol may be used as entrainer to remove water of reaction and cause the esterification to go to completion. Usually between about 15% and about 30% by weight of entrainer, based on the weight of the alcohol is sufficient.

Thus the $C_6$-$C_{12}$ alcohol, containing residual aliphatic esters of similar higher fatty acids, may be charged to the reactor together with the dicarboxylic acid, preferably charging a slight molecular excess of alcohol, for example, a 10% excess, and benzene or other entrainer. The mixture may be heated to about 85°–90° C., and the acid catalyst slowly added to avoid excess ebullition. The mixture is then refluxed with azeotropic removal of entrained water and return of entrainer to the reaction mixture until the esterification reaction is substantially complete as determined by acidity titration, usually a period of about 5 hours.

Upon completion of esterification, the entrainer may be removed from the mixture if desired but this is not necessary, and preferably the mixture containing the entrainer is cooled to somewhat below the boiling point of the esterification mass, for example, to about 80° C. when benzene is used, the latter remaining in the mixture. The mixture should be maintained at a temperature not appreciably below 75° C. during the subsequent steps since at lower temperatures the saponified ester contaminants congeal and resist removal. Higher temperatures may be employed if higher boiling entrainers such as toluene or xylene are used.

Neutralization of the catalyst and other residual acidity is then effected by adding to the mixture a relatively large volume of a relatively dilute alkali metal hydroxide solution, preferably sodium or potassium hydroxide solution. This treatment also saponifies the residual aliphatic ester contaminants, which dissolve to a large extent in the dilute aqueous alkali metal hydroxide solution.

It is essential for the success of the process that the concentration of the alkali metal hydroxide used in the neutralization be no greater than about 3%, preferably between about 2% and about 3%, and that the volume of dilute alkali metal hydroxide solution used in the neutralization be at least about 15% of the volume of the ester charge treated, preferably between about 15% and about 30% of the charge. If stronger solutions are used, or lesser quantities of the solution, incomplete removal of the saponified esters of the contaminating compounds will be effected in subsequent stratification, and difficulties in emulsification and foaming will be experienced in the recovery steps as well as degradation of final ester color.

The neutralization is effected by agitating the dilute alkali metal hydroxide solution with the esterification mixture for sufficient time to produce thorough mixing, usually between about 10 minutes and about 40 minutes being sufficient.

The neutralized mixture is then allowed to remain quiescent for a period sufficient for stratification to take place with the formation of an oily ester layer, and an aqueous alkali metal hydroxide layer, the latter containing the preponderant portion of the troublesome contaminants. A settling time of from about 15 minutes to about 90 minutes is usually sufficient to effect a clear separation of the phases and produce a sharp interface substantially free of emulsion, usually no more than about 5% of the combined mixture appearing as emulsion at the interface after about a half hour's settling, often less than 1%, whereas in the conventional prior art neutralization procedures using a 10% alkali metal hydroxide solution in charges between about 2% and about 5% of the volume of the esterification mixture, the esters resulting from these aliphatic ester-contaminated alcohols produce stable emulsions which often occupy from about 50% to as high as 90% of the volume of the neutralized mixture, even after an hour's quiescent standing, and cannot be completely resolved even by overnight standing.

The stratified neutralized ester is separated from the aqueous layer as by decantation or other conventional means, and is subjected to at least two washes with dilute aqueous alkali metal hydroxide solution of not more than about 2% concentration preferably between about 0.5% and about 2%. Concentrations between about 1% and about 1.5% are optimum. The wash solution should be added to the ester in volumes equal to at least about 15% of the ester charge, for example between about 15% and about 30% of the charge. The mixture is then agitated as described above, preferably for from about 10 minutes to about 30 minutes to assure thorough mixing, and then is allowed to remain quiescent, and to stratify into an oily ester layer and an aqueous alkali metal hydroxide layer, the latter containing additional portions of the residual contaminants. After separation of the washed ester, it is washed at least once more with a similar charge of dilute alkali metal hydroxide solution, layered, and the ester layer separated. During the neutralization and washing steps the temperature is continuously maintained at at least 75° C.

The washed ester (which may still contain benzene or other entrainer) is then concentrated as by steam distillation, i.e. by blowing the mixture with steam, in the presence of active carbon or other clarifying agents if desired to remove entrainer and residual alcohol. Temperature during steam distillation may conveniently be at conventional temperatures suitable for removing entrainer, suitably at 150°–160° C. at atmospheric pressure when benzene is the entrainer, followed by drying under vacuum at about 100° C. for about a half hour.

The esters of our invention, formed from $C_6$-$C_{12}$ aliphatic alcohols contaminated with alkyl esters of corresponding $C_6$-$C_{12}$ aliphatic acids, when neutralized and washed according to our invention as described above, exhibit virtually no emulsification during the neutralization and washing steps and virtually no foaming or condenser blocking difficulties in the concentrating step when carried out by steam distillation as described, whereas, when such esters are neutralized and washed according to prior art practices using concentrated alkali metal hydroxide solutions in relatively smaller quantities, serious emulsification occurs in the neutralization and washing, while upon concentration, foaming and condenser blockage occur to such extent as to preclude economic operation of such process; in many cases, the foams congealing to stiff gels in the condenser.

The resulting esters usually exhibit exceptionally light color, often as low as 10 Hazen and usually not higher than about 25 Hazen using the so-called $C_8$-$C_{10}$ alcohol blends obtained as by-products from the hydrogenation of coconut oil, whose percentage of ester contaminants usually is not greatly in excess of 5%. When the $C_6$-$C_{12}$ "Oxo" alcohols are employed, some of which are highly contaminated with troublesome residual esters, the resulting esters may have colors which are quite high, depending to considerable extent on the proportion of residual esters in the alcohol mixture. Such colors, however, are lighter than those of similar esters prepared using prior art neutralization and washing steps. If the "Oxo" alcohol mixture used is a by-product resulting from the preparation of more refined "Oxo" alcohol mixtures, the resulting ester colors may be considerably above 500 Hazen, or even as high as 1–8 on the Hellige scale. Such esters are useful as secondary plasticizers and plasticizer extenders.

It is essential that neutralization and washing steps be carried out at a temperature not lower than about 75° C. since lower temperatures result in the formation of a large, soapy emulsion interface which seriously reduces the yield of ester. Higher temperatures, up to the boiling point of the resulting esterification mixtures may be used, but are not necessary, temperatures between about 75° C. and about 85° C. usually being optimum.

The following specific examples further illustrate our invention. Parts are by weight except as otherwise noted.

*Example 1*

An esterification was carried out in which n-octyl, n-decylphthalate was prepared by reacting phthalic anhydride with a $C_8$-$C_{10}$ alcohol blend obtained as a by-product of the hydrogenation of coconut oil, and having the following characteristics:

Approximate composition:

| | |
|---|---|
| $C_6$ alcohols _____weight percent | 2.9 |
| $C_8$ _____do____ | 59.0 |
| $C_{10}$ _____do____ | 32.2 |
| $C_{12}$ _____do____ | 1.0 |
| Esters _____do____ | 1.4 |
| Residue _____do____ | 3.5 |
| Approximate molecular weight _____ | 135 |
| Appearance _____ | Clear |
| Color, Hazen _____ | 15 |
| Acidity as acetic acid, percent _____ | 0.002 |
| Sp. gr. at 25/15.5° C. _____ | 0.820 |
| $H_2O$ by volume, percent _____ | 0.8 |
| Alcohol number _____ | 414.3 |
| Saponification number _____ | 3.04 |

Distillation:

| | |
|---|---|
| Start _____° C. | <170.0 |
| 5 _____° C. | 193.6 |
| 10 _____° C. | 197.4 |
| 50 _____° C. | 206.8 |
| 90 _____° C. | 229.0 |
| 95 _____° C. | >230.0 |
| 98 _____° C. | >230.0 |
| Recovery _____percent__ | 98 |

In carrying out the esterification, 385 parts of phthalic anhydride (2.6 mols) were mixed with 772 parts of the $C_8$-$C_{10}$ alcohol blend (a 10% mol excess of alcohol) and 176 parts of benzene (200 volume parts) as entrainer, in a reaction vessel. The mixture was heated to 85–90° C., then sulfuric acid catalyst was added slowly. The mixture was then allowed to reflux with azeotropic removal of water and benzene with separation of water and return of benzene to the reaction vessel, until acidity titration of samples indicated substantial completion of the reaction.

The resulting esterification mixture, amounting to 1370 volume parts, was cooled to just below 80° C., and to it was added 274 parts by volume (20% of the reaction mixture) of a 2.5% aqueous solution of sodium hydroxide. The mixture was agitated for 20 minutes, then allowed to remain quiescent for one half hour. After the settling period had elapsed, the resulting mixture had stratified sharply into a clear oily ester layer and an aqueous layer with a sharp interface, i.e. with only about 1% of the volume of the total mixture appearing as emulsion at the interface. The aqueous layer was separated from the oily layer, resulting in a clear liquid of about 1370 volume parts. To the separated oily portion was added 274 parts by volume (20 volume percent of charge) of a 1.3% aqueous solution of sodium hydroxide, the mixture agitated for 10 minutes, allowed to settle for a half hour, separated and given a similar second treatment with 1.3% aqueous sodium hydroxide and separated from the aqueous phase. The ester mixture was maintained at a temperature between about 75° C. and about 80° C. during the entire course of the neutralization and washing treatments.

The resulting washed mixture was then subjected to a concentration step, to remove benzene and residual alcohol, by blowing with steam. During this treatment no foaming occurred, and upon its completion a clean separation of oil and water took place with no condenser blockage. The resulting finished ester, after a treatment with active carbon, was obtained in a yield of 92% based on the phthalic anhydride charged. The product was clear, had a Hazen color of 15, acidity as acetic of 0.01%; specific gravity at 25/25° C. of 0.9744, saponification number of 279, and a mild, characteristic odor.

For purposes of comparison, a test (Example 1A) was carried out in a manner identical to that described above, except that after competion of the esterification, the resulting esterification mixture was agitated at 80° C. with 68.5 volume parts of a 10% aqueous solution of sodium hydroxide (5% by volume of the reaction mixture) for 20 minutes then allowed to remain quiescent for ½ hour. At the end of the settling period, the mixture was badly emulsified, and only slight stratification had occurred, more than 50% of the volume of the mixture appearing as emulsion at the interface. After standing overnight the mixture had settled sufficiently so that a partial separation could be effected. The oily layer in the mixture was then separated, washed twice with a 5% by volume wash of 5% aqueous sodium hydroxide solution, with intermediate separation. In both washes, severe emulsification was encountered. The washed product was then subjected to steam blowing which resulted in severe foaming of the mixture and finally in complete condenser blockage by formation of a stiff gel in the condenser. The final ester was recovered in a yield of only 87% and after treatment with active carbon had a Hazen color of 70.

Conditions and results of the two runs are compared below.

|  | 1 | 1A |
|---|---|---|
| $C_8$–$C_{10}$ Alcohol (Mols) | 5.72 | 5.72 |
| Benzene, mls | 200 | 200 |
| Phthalic anhydride (mols) | 2.6 | 2.6 |
| Catalyst, Percent on PAA | 1 | 1 |
| Esterification time (hours) | 5 | 5 |
| Percent Conversion | 98 | 98 |
| Neutralization NaOH, Percent | 2.5 | 10 |
| Appearance | Clear | Emulsified |
| Percent Emulsion | 1 | 50 |
| Washes, NaOH, Percent | 1.3 | 5 |
| Washes, Number | 2 | 2 |
| Appearance | Clear | Emulsified |
| Percent Emulsion | 0 | 50 |
| Concentration: |  |  |
| Foaming | No foam | Heavy foam |
| Condenser blockage | No blockage | Blockage |
| Yield on PAA, Percent | 92 | 87 |
| Color, Hazen | 15 | 70 |

*Example 2*

A large scale run was made in which n-octyl, n-decylphthalate was prepared in a manner similar to that described in Example 1 above, using the $C_8$–$C_{10}$ alcohol as described therein, by charging the esterification reactor with the following:

| | |
|---|---|
| $C_8$–$C_{10}$ alcohol | parts 8200 |
| Benzene | do 2000 |
| Phthalic anhydride | do 3850 |
| $H_2SO_4$, 80% solution | do 46.5 |

The mixture was heated to reflux temperature (130–140° C.) and refluxed under atmospheric pressure with separation of water and return of benzene to the reactor until the esterification was complete in about five hours. The mixture, which occupied about 1500 volume parts, was then cooled to 80° C. and 2892 parts by weight, or about 347 parts by volume, of a 2.7% aqueous solution of sodium hydroxide, a charge equivalent to about 23% by volume of the treated mixture, was added to neutralize the mixture. The mixture was agitated with the sodium hydroxide solution for 30 minutes while maintaining the temperature at 80° C. The mixture was then allowed to remain quiescent for 1 hour, while still maintaining the temperature at 80° C. After settling, the mixture had stratified into an oily ester layer and an aqueous layer with virtually no emulsification, there being a sharp interface. The stratified layers were separated. To the oily layer which occupied about the same volume as the original esterification mixture, was added 2857 parts by weight (344 parts by volume) of a 1.4% aqueous solution of sodium hydroxide, a charge equivalent to about 23% the volume of the ester material. The mixture was agitated for 30 minutes at 80° C. then allowed to settle for one hour at 80° C. No foaming or emulsification was apparent. The layers which formed were separated, and the oily layer again treated with 2857 parts of a 1.4% sodium hydroxide solution with similar agitation and settling, again with no evidence of foaming or emulsification.

The resulting separated ester was agitated with 12.4 parts of active carbon and 30 parts of magnesium silicate ("Magnesol") to aid in decolorization, and steam distilled by blowing with steam for 3 hours at 160° C. followed by ½ hour at 110° C. at reduced pressure of 100 mm. Hg (full vacuum). No foaming or blocking difficulties were encountered during distillation.

In runs similar in all respects to the above, except that neutralization was effected with a 5% by volume charge of 10% sodium hydroxide, and washing was effected with a 5% by volume charge of 5% sodium hydroxide, heavy emulsification occurred in the neutralization and washing steps, and upon concentration, foaming was severe and heavy gels formed which blocked the condenser.

The finished n-octyl, n-decylphthalate product had a Hazen color of 25, specific gravity at 25° C. of 0.9698, acidity as phthalic acid of .001, a clear appearance and a mild odor.

*Example 3* n-Octyl, n-decyl adipate was prepared by esterifying adipic acid with a $C_8$–$C_{10}$ alcohol blend of the same character as that described in the foregoing examples in the presence of benzene sulfonic acid catalyst and benzene entrainer. In carrying out the run, 2.6 mols of adipic acid, 5.72 mols of the $C_8$–$C_{10}$ alcohol (a 10% mol excess) were charged, together with 200 milliliters of benzene to a reaction vessel and heated to 85–90° C. Benzene sulfonic acid was then added slowly in an amount equivalent to 2.4% of the adipic acid charged. The mixture was then refluxed until esterification was complete after about 4 hours, as indicated by acidity titration. Upon completion of the esterification the mixture was cooled to just below 85° C. The mixture had a volume equivalent to about 1370 parts. To this was added 274 volume parts of a 2.5% aqueous sodium hydroxide solution 20% by volume of the charge, to neutralize catalyst acidity, and the mixture was agitated for 15 minutes, and then permitted to remain quiescent for one half hour. At this time the mixture had layered sharply into an aqueous layer and an oily ester layer and exhibited virtually no emulsion formation whereas similar runs in which neutralization had been carried out by agitating with 2–5% by volume charges of a 10% sodium hydroxide solution emulsified badly and could not be separated after an hour's settling.

The neutralized ester was separated from the aqueous layer and washed by adding to it a quantity of 1.3% aqueous sodium hydroxide solution equal to 20% the volume of the neutralized ester. The mixture was agitated for 15 minutes and allowed to settle for a half hour, whereupon layers separated with a sharp interface and virtually no emulsification. A second washing similar to the above was carried out, then the separated, washed ester was concentrated by steam distillation to remove benzene and residual alcohol. During the above neutralization and washing steps the temperature of the esterification mass was maintained between 75° and 85° C. Operations exhibited no difficulties from foaming or condenser blockage. The product was dried under vacuum at 100° C. and 100 mm. Hg. The finished ester was filtered and resulted in an n-octyl, n-decyl adipate product in a yield of 92% based on the adipic acid charged, and which had a Hazen color of 10, specific gravity at 20/20° C. of 0.9189, acidity of 0.007, saponification number 292.5, a clear appearance and a mild odor.

*Example 4*

An esterification was carried out in which phthalic anhydride was reacted with a mixture of by-product higher alcohols obtained as a residue after removal of the major portion of $C_8$ alcohols from an alcohol mixture prepared by the "Oxo" process and having the following characteristics:

| Approximate composition: | Weight percent |
|---|---|
| Octyl alcohol | 5 |
| Nonyl alcohol | 10 |
| Decyl and higher alcohols | 35 |
| Esters | 45 |
| Soaps | 5 |
| | 100 |

| | |
|---|---|
| Approximate molecular weight | 290 |
| Specific gravity at 20° C. | 0.841 |
| Percent acidity as acetic | 0.05 |
| Color, Hazen | 150+ |
| Hydroxyl No. | 192 |
| Saponification No. | 12.2 |
| Appearance | Clear amber liquid |

Distillation: °C.
Start
 5 ------------------------------------- 208
 10 ------------------------------------ 224
 50 ------------------------------------ 239
 95 ------------------------------------ 288
 99 ------------------------------------ 360

In carrying out the esterification, 1.5 moles of phthalic anhydride were mixed with 150 ml. of benzene and 3.3 mols of alcohol (a 10% mol excess of alcohol) and heated to 85° C. Benzene sulfonic acid catalyst was then added slowly in an amount equal to 3% by weight of the phthalic anhydride, and the mixture was further heated and refluxed at 110–140° C. until esterification was complete as determined by acidity titration, a period of 5 hours. The esterification mixture was then cooled to 850° C. The mixture, amounting to 1500 volume parts, was then neutralized by addition of 300 parts by volume of a 2.5% sodium hydroxide solution, and agitated for about 30 minutes. The mixture was then allowed to settle for an hour, after which it formed an oily ester layer and an aqueous layer between which there showed a rusty interface occupying about 5% of the volume of the mixture.

The ester layer was separated and agitated with 300 parts by volume of a 1.25% sodium hydroxide solution and again allowed to settle, and upon layering formed an oily layer and an aqueous layer between which there was an interface occupying only about 1% of the volume of the mixture. The ester layer was separated and subjected to a second wash as before with similar results. The esterification mass was maintained at a temperature between 75° and 85° C. during the above neutralization and washing operations.

The twice-washed ester was then subjected to concentration by blowing with steam at 160° C. at 100 mm. Hg for 1.5 hours in the presence of 0.1% active carbon. Virtually no foaming or condenser blockage occurred.

The yield of mixed $C_8$–$C_{10}$ phthalate ester amounted to 98% based on the phthalic anhydride charged and an alcohol molecular weight of 290. The color of the resulting ester, while high, over 500 Hazen, was considerably lighter than a similar ester prepared with the customary prior art neutralization and washing steps and provided an ester suitable for use as a secondary or extender plasticizer.

When an esterification mixture similar to that above was neutralized with a 10% solution of sodium hydroxide in a charge equal to about 5% of the volume of the mixture, excessive emulsification occurred, resulting in an interface after an hour's standing of about 90% of the volume of the mixture which could not be resolved even on long standing and made recovery of the mixture thus produced virtually impracticable.

While the above describes the preferred embodiments of our invention, it will be understood that departures may be made therefrom within the scope of the specification and claims.

We claim:

1. In a process for esterifying dicarboxylic acids with $C_6$ to $C_{12}$ aliphatic alcohols contaminated with alkyl esters of $C_6$ to $C_{12}$ aliphatic acids, wherein troublesome emulsification and foaming during the recovery steps are avoided, the steps which comprise, mixing the esterification mass resulting from the interaction of a dicarboxylic acid material and a $C_6$ to $C_{12}$ aliphatic alcohol so contaminated, at a temperature between about 75° C. and the boiling temperature of the resulting mixture, with a quantity of an aqueous alkali metal hydroxide solution, of between about 2% and about 3% concentration, equal in volume to between about 15% and about 30% of the volume of the esterification mixture, allowing the neutralized mixture to stratify into an oily ester layer and an aqueous layer; separating the ester layer from the aqueous layer, subjecting the ester layer at a temperature between about 75° C. and the boiling temperature of the resulting mixture to at least two washing treatments with a quantity of aqueous alkali metal hydroxide solution of between about 0.5% and about 2% concentration, equal to between about 15% and about 30% of the volume of the ester mass, allowing the mixture to stratify into an oil ester layer and an aqueous layer, separating the ester layer from the aqueous layer.

2. The process according to claim 1 wherein the alcohol is a blend of predominantly 8 and 10 carbon atom aliphatic alcohols produced by the hydrogenation of coconut oil.

3. The process according to claim 2 wherein the dicarboxylic acid material is phthalic anhydride.

4. The process according to claim 2 wherein the dicarboxylic acid material is adipic acid.

5. The process according to claim 1 wherein the alcohol is a $C_8$ to $C_{12}$ aliphatic alcohol residue remaining after removal of the major portion of $C_8$ alcohols from an alcohol blend obtained by carbonylation and hydrogenation of olefins.

6. The process according to claim 1 wherein the esterification mass contains between about 15% and about 30% by weight of entrainer based on the weight of the alcohol charged.

7. A process for purifying esters of dicarboxylic acids and $C_6$ to $C_{12}$ aliphatic alcohols contaminated with residual alkyl esters of corresponding $C_6$ to $C_{12}$ aliphatic acids, wherein troublesome emulsification and foaming during the recovery steps are avoided, the steps which comprise mixing the thus contaminated ester at a temperature between about 75° C. and the boiling temperature of the resulting mixture with a quantity of an aqueous alkali metal hydroxide solution, of between about 2% and about 3% concentration, equal in volume to between about 15% and about 30% of the volume of the ester mass, allowing the thus produced mixture to stratify into an oily ester layer and an aqueous layer; separating the ester layer from the aqueous layer; and subjecting the ester layer, at a temperature between about 75° C. and the boiling point of the resulting mixture to at least two washing treatments with a quantity of an alkali metal hydroxide solution of between about 0.5% and about 2% concentration, equal to between about 15% and about 30% of the volume of the ester mass.

References Cited in the file of this patent

UNITED STATES PATENTS

| | | |
|---|---|---|
| 2,131,925 | Ware | Oct. 4, 1938 |
| 2,610,201 | Rutherford | Sept. 9, 1952 |
| 2,805,246 | Bourguignon et al. | Sept. 3, 1957 |

UNITED STATES PATENT OFFICE
CERTIFICATE OF CORRECTION

May 8, 1962

Patent No. 3,033,895

Caleb Rehfuss et al.

It is hereby certified that error appears in the above numbered patent requiring correction and that the said Letters Patent should read as corrected below.

Column 6, line 55, for "competion" read -- completion --; column 9, line 18, for "850° C." read -- 85° C. --.

Signed and sealed this 16th day of October 1962.

(SEAL)
Attest:

ERNEST W. SWIDER
Attesting Officer

DAVID L. LADD
Commissioner of Patents